US009866480B1

United States Patent
Borad et al.

(10) Patent No.: US 9,866,480 B1
(45) Date of Patent: Jan. 9, 2018

(54) HASH RANGE LOOKUP COMMAND

(71) Applicant: Netronome Systems Inc., Santa Clara, CA (US)

(72) Inventors: Hetal S. Borad, Boxborough, MA (US); Gavin J. Stark, Cambridge (GB); Ron L. Swartzentruber, Amesbury, MA (US)

(73) Assignee: Netronome Systems, Inc., Santa Clara, CA (US)

(*) Notice: Subject to any disclaimer, the term of this patent is extended or adjusted under 35 U.S.C. 154(b) by 130 days.

(21) Appl. No.: 14/927,455

(22) Filed: Oct. 29, 2015

Related U.S. Application Data

(60) Provisional application No. 62/069,834, filed on Oct. 29, 2014.

(51) Int. Cl.
*H04L 12/743* (2013.01)
*G06F 3/06* (2006.01)

(52) U.S. Cl.
CPC .......... *H04L 45/7453* (2013.01); *G06F 3/067* (2013.01); *G06F 3/0613* (2013.01); *G06F 3/0659* (2013.01)

(58) Field of Classification Search
None
See application file for complete search history.

(56) References Cited

U.S. PATENT DOCUMENTS

| | | | | |
|---|---|---|---|---|
| 4,336,588 A | * | 6/1982 | Vernon | G06F 13/126 710/260 |
| 8,892,938 B1 | * | 11/2014 | Sundaram | G06F 11/2092 707/650 |
| 2007/0013705 A1 | * | 1/2007 | Roach | G06F 12/0223 345/544 |
| 2013/0238876 A1 | * | 9/2013 | Fiske | G06F 3/0641 711/216 |
| 2013/0304926 A1 | * | 11/2013 | Mital | G06F 15/167 709/226 |
| 2017/0046395 A1 | * | 2/2017 | Li | G06F 17/3033 |

* cited by examiner

*Primary Examiner* — Charles C Jiang
*Assistant Examiner* — George Atkins, Jr.
(74) *Attorney, Agent, or Firm* — Imperium Patent Works LLP; T. Lester Wallace; Mark D. Marrello

(57) ABSTRACT

A novel hash range lookup command is disclosed. In an exemplary embodiment, a method includes (a) providing access to a hash table that includes hash buckets having hash entry fields; (b) receiving a novel hash lookup command; (c) using the hash lookup command to determine hash command parameters, a hashed index value, and a flow key value; (d) using the hash command parameters and the hashed index value to generate hash values (addresses) to access entry fields in a selectable number of hash buckets; (e) comparing bits of the entry value in the entry field to bits of the flow key value; (f) repeating (d) through (e) until a match is determined or until the selectable number of hash buckets and entries have been accessed; and (g) returning either an address of the entry field containing the match or a result associated with the entry field containing the match.

19 Claims, 15 Drawing Sheets

COMMUNICATION SYSTEM

FLOW PROCESSOR EXPANSION CARD

NETWORK FLOW PROCESSOR INTEGRATED CIRCUIT

ME ISLAND

MU HALF ISLAND AND CACHE BLOCK

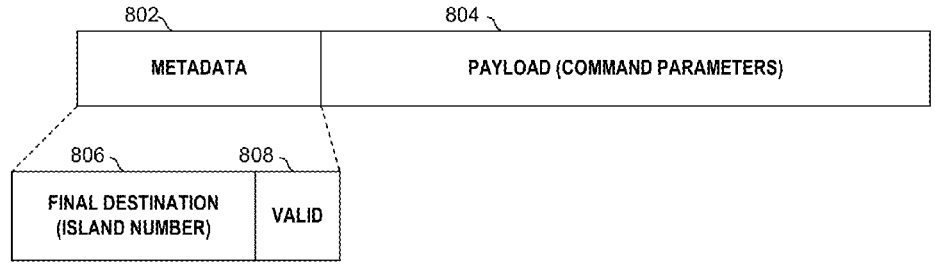

HASH COMMAND LAYOUT

FIG. 8

| FIELD | WIDTH | DESCRIPTION |
|---|---|---|
| TARGET | 4 | CPP TARGET FOR THE COMMAND |
| ACTION | 5 | ACTION RECOGNIZED BY THE CPP TARGET INDICATING WHAT SHOULD BE PERFORMED |
| TOKEN | 2 | SUBTYPE OF ACTION |
| LENGTH | 5 | LENGTH OF COMMAND |
| ADDRESS | 40 | ADDRESS OF COMMAND OR TYPE OF OPERATION |
| BYTE_MASK | 8 | FURTHER OPTIONS OF A COMMAND |
| DATA_MASTER_ISLAND | 6 | ISLAND OF DATA MASTER |
| DATA_MASTER | 4 | MASTER WITHIN THE ISLAND |
| DATA_REF | 14 | PUSH-PULL ID REFERENCE INDICATING TO THE DATA MASTER WHERE TO PUSH/PULL FROM |
| SIGNAL_MASTER | 10 | EXTENSION FOR DATA_REF AS A DATA MASTER ONLY |
| SIGNAL_REF | 7 | REFERENCE WITHIN THE SIGNAL MASTER AS TO WHEN SIGNAL SHOULD BE INDICATED WITH THE COMMANDS OF PUSH OR PULL |

HASH COMMAND PAYLOAD (COMMAND PARAMETERS)

FIG. 9

| 39:38 | 37:31 | 30 | 29 | 28:12 | 11 | 10:8 | 7:2 | 1:0 |
|---|---|---|---|---|---|---|---|---|
| DIRECT/ NON DIRECT ACCESS | N/A | 0 = NOT A DIRECT LOOKUP | 1 = HASH LOOKUP | 17-BIT BASE ADDRESS | N/A | 3-BIT TABLE SIZE 1K TO 128K | 6-BIT HASH COMMAND CODE | 2-BIT START POSITION 0 = BIT-0 1 = BIT-32 2 = BIT-64 3 = BIT-96 |

ADDRESS FIELD OF COMMAND PAYLOAD

FIG. 10

| HASH COMMAND | CMD CODE IN HEX |
|---|---|
| LHASHR 16-28 (16-BYTE BUCKET SIZE) WITH 2 BUCKET SEARCH | 6-BIT HEX (20) |
| LHASHR 16-28 (16-BYTE BUCKET SIZE) WITH 4 BUCKET SEARCH | 6-BIT HEX (28) |
| LHASHR 16-28 (16-BYTE BUCKET SIZE) WITH 7 BUCKET SEARCH | 6-BIT HEX (2C) |
| LHASHR 16-28 (64-BYTE BUCKET SIZE) WITH 2 BUCKET SEARCH | 6-BIT HEX (21) |
| LHASHR 16-28 (64-BYTE BUCKET SIZE) WITH 4 BUCKET SEARCH | 6-BIT HEX (29) |
| LHASHR 16-28 (64-BYTE BUCKET SIZE) WITH 7 BUCKET SEARCH | 6-BIT HEX (2D) |
| LHASHR 48-60 (16-BYTE BUCKET SIZE) WITH 2 BUCKET SEARCH | 6-BIT HEX (22) |
| LHASHR 48-60 (16-BYTE BUCKET SIZE) WITH 4 BUCKET SEARCH | 6-BIT HEX (2A) |
| LHASHR 48-60 (16-BYTE BUCKET SIZE) WITH 7 BUCKET SEARCH | 6-BIT HEX (2E) |
| LHASHR 48-60 (64-BYTE BUCKET SIZE) WITH 2 BUCKET SEARCH | 6-BIT HEX (23) |
| LHASHR 48-60 (64-BYTE BUCKET SIZE) WITH 4 BUCKET SEARCH | 6-BIT HEX (2B) |
| LHASHR 48-60 (64-BYTE BUCKET SIZE) WITH 7 BUCKET SEARCH | 6-BIT HEX (2F) |
| LHASH 16-28 (16-BYTE BUCKET SIZE) WITH 2 BUCKET SEARCH | 6-BIT HEX (30) |
| LHASH 16-28 (16-BYTE BUCKET SIZE) WITH 4 BUCKET SEARCH | 6-BIT HEX (38) |
| LHASH 16-28 (16-BYTE BUCKET SIZE) WITH 7 BUCKET SEARCH | 6-BIT HEX (3C) |
| LHASH 16-28 (64-BYTE BUCKET SIZE) WITH 2 BUCKET SEARCH | 6-BIT HEX (31) |
| LHASH 16-28 (64-BYTE BUCKET SIZE) WITH 4 BUCKET SEARCH | 6-BIT HEX (39) |
| LHASH 16-28 (64-BYTE BUCKET SIZE) WITH 7 BUCKET SEARCH | 6-BIT HEX (3D) |
| LHASH 48-60 (16-BYTE BUCKET SIZE) WITH 2 BUCKET SEARCH | 6-BIT HEX (32) |
| LHASH 48-60 (16-BYTE BUCKET SIZE) WITH 4 BUCKET SEARCH | 6-BIT HEX (3A) |
| LHASH 48-60 (16-BYTE BUCKET SIZE) WITH 7 BUCKET SEARCH | 6-BIT HEX (3E) |
| LHASH 48-60 (64-BYTE BUCKET SIZE) WITH 2 BUCKET SEARCH | 6-BIT HEX (33) |
| LHASH 48-60 (64-BYTE BUCKET SIZE) WITH 4 BUCKET SEARCH | 6-BIT HEX (3B) |
| LHASH 48-60 (64-BYTE BUCKET SIZE) WITH 7 BUCKET SEARCH | 6-BIT HEX (3F) |

6-BIT COMMAND CODES

FIG. 11

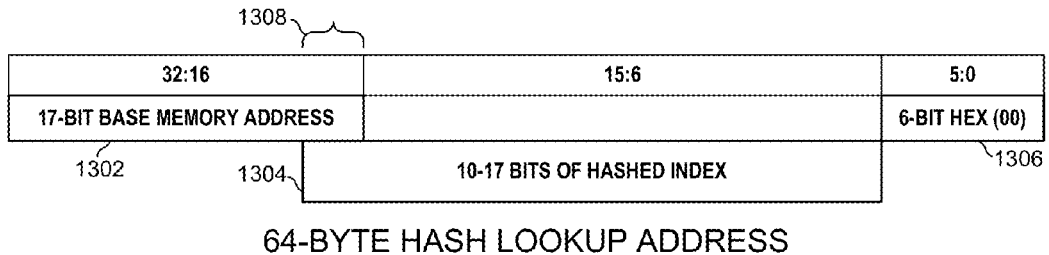
64-BYTE HASH LOOKUP ADDRESS
FIG. 13
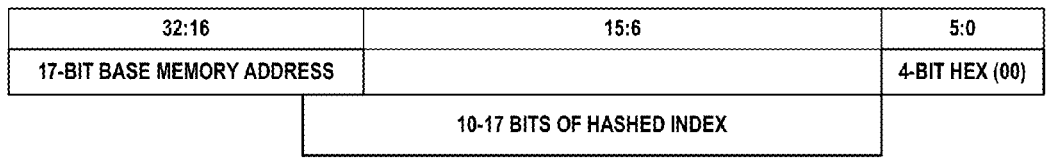
16-BYTE HASH LOOKUP ADDRESS
FIG. 14
| DATA LINE | 127:96 | 95:64 | 63:32 | 31:0 |
|---|---|---|---|---|
| 1 | BV.OP.ENTRY 3 | BV.OP.ENTRY 2 | BV.OP.ENTRY 1 | BV.OP.ENTRY 0 |
16-BYTE LHASH16/LHASH28 CONFIGURATION
FIG. 15
| DATA LINE | 127:96 | 95:64 | 63:32 | 31:0 |
|---|---|---|---|---|
| 1 | BV.OP.ENTRY 3 | BV.OP.ENTRY 2 | BV.OP.ENTRY 1 | BV.OP.ENTRY 0 |
| 2 | BV.OP.ENTRY 7 | BV.OP.ENTRY 6 | BV.OP.ENTRY 5 | BV.OP.ENTRY 4 |
| 3 | BV.OP.ENTRY 11 | BV.OP.ENTRY 10 | BV.OP.ENTRY 9 | BV.OP.ENTRY 8 |
| 4 | BV.OP.ENTRY 15 | BV.OP.ENTRY 14 | BV.OP.ENTRY 13 | BV.OP.ENTRY 12 |
64-BYTE LHASH16/LHASH28 CONFIGURATION
FIG. 16

| DATA LINE | 127:96 | 95:64 | 63:32 | 31:0 |
|---|---|---|---|---|
| 1 | BV.OP.ENTRY 1 | | BV.OP.ENTRY 0 | |

16-BYTE LHASH48/LHASH60 CONFIGURATION

FIG. 17

| DATA LINE | 127:96 | 95:64 | 63:32 | 31:0 |
|---|---|---|---|---|
| 1 | BV.OP.ENTRY 1 | | BV.OP.ENTRY 0 | |
| 2 | BV.OP.ENTRY 3 | | BV.OP.ENTRY 2 | |
| 3 | BV.OP.ENTRY 5 | | BV.OP.ENTRY 4 | |
| 4 | BV.OP.ENTRY 7 | | BV.OP.ENTRY 6 | |

64-BYTE LHASH48/LHASH60 CONFIGURATION

FIG. 18

| DATA LINE | 127:96 | 95:64 | 63:32 | 31:0 |
|---|---|---|---|---|
| 1 | RESULT 1 | BV.OP.ENTRY 1 | RESULT 0 | BV.OP.ENTRY 0 |

16-BYTE LHASHR16/LHASHR28 CONFIGURATION

FIG. 19

| DATA LINE | 127:96 | 95:64 | 63:32 | 31:0 |
|---|---|---|---|---|
| 1 | RESULT 1 | BV.OP.ENTRY 1 | RESULT 0 | BV.OP.ENTRY 0 |
| 2 | RESULT 3 | BV.OP.ENTRY 3 | RESULT 2 | BV.OP.ENTRY 2 |
| 3 | RESULT 5 | BV.OP.ENTRY 5 | RESULT 4 | BV.OP.ENTRY 4 |
| 4 | RESULT 7 | BV.OP.ENTRY 7 | RESULT 6 | BV.OP.ENTRY 6 |

64-BYTE LHASHR16/LHASHR28 CONFIGURATION

FIG. 20

| DATA LINE | 127:96 | 95:64 | 63:32 | 31:0 |
|---|---|---|---|---|
| 1 | XXXX-XXXX | RESULT 0 | BV.OP.ENTRY 0 | |

16-BYTE LHASHR48/LHASHR60 CONFIGURATION

FIG. 21

| DATA LINE | 127:96 | 95:64 | 63:32 | 31:0 |
|---|---|---|---|---|
| 1 | XXXX-XXXX | RESULT 0 | BV.OP.ENTRY 0 | |
| 2 | XXXX-XXXX | RESULT 1 | BV.OP.ENTRY 1 | |
| 3 | XXXX-XXXX | RESULT 2 | BV.OP.ENTRY 2 | |
| 4 | XXXX-XXXX | RESULT 3 | BV.OP.ENTRY 3 | |

64-BYTE LHASHR48/LHASHR60 CONFIGURATION

FIG. 22

| 31 | 30 | 29 | 28:12 | 11 | 10:8 | 7:2 | 1:0 |
|---|---|---|---|---|---|---|---|
| 0 = LOOKUP OPERATION COMPLETE | | | 31-BIT HASH RESULT | | | | |
| 1 = FURTHER LOOKUP REQUIRED | 0 = NOT A DIRECT LOOKUP | 1 = HASH LOOKUP | 17-BIT BASE ADDRESS | LOCATION 0 = INT MEM 1 = EXT MEM | 3-BIT TABLE SIZE 1K TO 128K | 6-BIT HASH COMMAND (CAM LOOKUP) | 2-BIT START POSITION 0 = BIT-0 1 = BIT-32 2 = BIT-64 3 = BIT-96 |

COMMAND FOR ITERATIVE LOOKUP

FIG. 23

METHOD OF OPERATING MICROENGINE

METHOD OF OPERATING LOOKUP ENGINE

HASH RANGE LOOKUP COMMAND

CROSS REFERENCE TO RELATED APPLICATION

The present application claims the benefit under 35 U.S.C. §119(e) from U.S. Provisional Application No. 62/069,834 entitled "HASH RANGE LOOKUP COMMAND" filed on Oct. 29, 2014, the subject matter of which is expressly incorporated herein by reference.

TECHNICAL FIELD

The described embodiments relate generally to performing flow key lookups using hash tables and to related structures.

BACKGROUND INFORMATION

A conventional network switching appliance receives packets of a flow onto one of several input ports. For each packet, the switching appliance examines parts of the headers of the packet, and from these headers determines the flow to which the packet belongs. For each such flow, the switching appliance may be preconfigured so that it will output packets of that flow onto the predetermined one of the output ports. Once the flow of a packet has been identified, the switching appliance outputs the packet onto the appropriate output port in accordance with how the switching appliance has been preconfigured.

One type of conventional network switching appliance may operate to switch several millions of flows. The switching appliance may receive packets at a 10 Gbps rate or more on each of several input ports, and may output the packets onto several output ports at a 10 Gbps rate or more onto each of one or more output ports. In such a switching appliance, the flow of a packet is determined by a flow key, where the flow key is a concatenation or a combination of the IP source address of the packet, the IP destination address of the packet, the TCP source port of the packet, the TCP destination port of the packet, and other parameters. These identifying values are extracted from the headers of an incoming packet and are concatenated or otherwise combined to form the flow key. A hash algorithm is then used to convert the flow key into a shorter hash value. The hash value is then used as an index into a hash table of hash entries. The hash algorithm may convert multiple different flow keys into the same hash value, so the hash table will be indexed the same way to point to the same hash entry despite the packets being of these different flows. The hash entry stores the full flow key, and also stores or points to or is otherwise associated with certain associated lookup information. The lookup information may, for example, indicate an output port of the switching appliance from which packets of the flow are to be output.

It would be desirable to have a mechanism that speeds up or otherwise improves this lookup operation in a switching appliance.

SUMMARY

An Island-Based Network Flow Processor (IB-NFP) integrated circuit comprises a MU (Memory Unit) island, a ME (MicroEngine) island, and a CPP (Command/Push/Pull) bus. The MU maintains a hash table. The hash table includes a plurality of hash buckets. Each hash buck comprises a plurality of hash value entry fields. A microengine on the ME island sends a novel hash range lookup command across the command mesh of the CPP bus to a lookup engine in the MU island. The hash range lookup command either contains and/or is used to determine: 1) a flow key value, 2) a hashed index value, and 3) a selectable number of hash bucket entries to be searched. In one example, the lookup engine in response to receiving the hash range lookup command (also referred to here as a "hash command") issues a pull-id on the pull-id mesh of the CPP bus. In response, the microengine returns pull data on the pull data mesh of the CPP bus. The pull data includes the flow key value and an index value. A base value was communicated to the lookup engine as part of the hash command. The lookup engine uses the base address value and the index value to determine the hash value (address). The hash value points to one of the hash bucket entries. The lookup engine uses the hash command to identify a selectable set of hash buckets in the hash table. The lookup engine then examines the hash value entry fields of the selected hash buckets to determine if one of the hash value entry fields matches the flow key value. In one novel aspect, the maximum number of hash value entry fields that the lookup engine examines is set by the selectable number of hash buckets. Even if the hash table contains more than the selectable number of hash buckets, the lookup engine nonetheless only examines entry values in the identified buckets. If the lookup engine finds the flow key value stored in one of the examined hash value entry fields, then the lookup engine returns either a result or an address to the microengine that sent the hash command. The result is a result value that is stored in association with the hash value entry field that stored the matching flow key. The address is the address of the hash value entry field. By utilizing the selectable number of buckets, the hash table can be efficiently searched to increase packet processing speeds.

Although the terms "flow key", "hash value", "hash bucket", "hash value entry field" and "entry value" are used to describe the novel command and methods of the IB-NFP's operation in using the command in the descriptions herein, the various values and structures involves can be referred to by other names and terms. The description that follows is a description of exemplary embodiments of the novel command and operational methods and apparatus set forth above. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 shows a diagram of a hash command.

FIG. 9 shows a detailed diagram of the command payload of the hash command.

FIG. 10 shows a detailed diagram of the address field included in the command payload.

FIG. 11 shows a detailed table diagram that illustrates 6-bit hash command codes included in the command payload.

FIG. 13 shows a diagram that illustrates the operation of an OR function to generate an address (hash value) that is used to address a hash table having 64-byte entries.

FIG. 14 shows a diagram that illustrates the operation of an OR function to generate an address (hash value) that can be used to address a hash table having 16-byte entries.

FIG. 15 shows a 16-byte LHASH16/LHASH28 hash table memory configuration.

FIG. 16 shows a 64-byte LHASH16/LHASH28 hash table memory configuration.

FIG. 17 shows a 16-byte LHASH48/LHASH60 hash table memory configuration.

FIG. 18 shows a 64-byte LHASH48/LHASH60 hash table memory configuration.

FIG. 19 shows a 16-byte LHASHR48/LHASHR60 hash table memory configuration.

FIG. 20 shows a 64-byte LHASHR48/LHASHR60 hash table memory configuration.

FIG. 21 shows a 16-byte LHASHR48/LHASHR60 hash table memory configuration.

FIG. 22 shows a 64-byte LHASHR48/LHASHR60 hash table memory configuration.

FIG. 23 shows an exemplary embodiment of a hash command that indicates an iterative lookup operation.

DETAILED DESCRIPTION

Reference will now be made in detail to some embodiments of the invention, examples of which are illustrated in the accompanying drawings.

Figure 1:
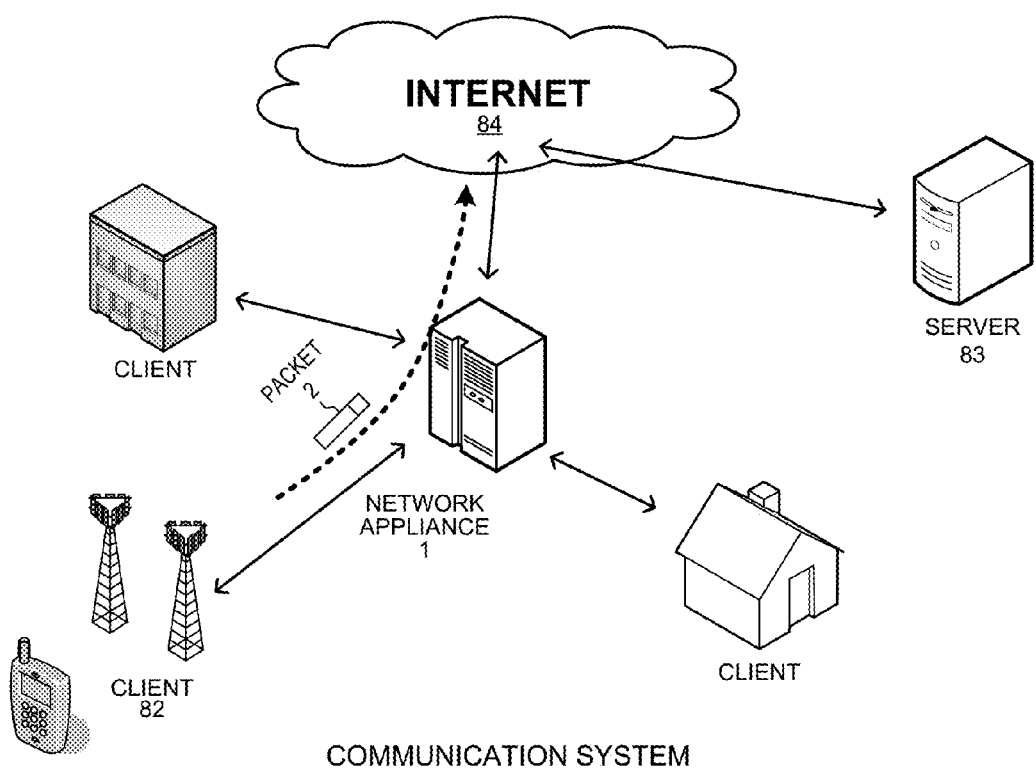
FIG. 1 shows a communication system in which a network appliance comprises an exemplary embodiment of a novel lookup mechanism.

FIG. 1 shows a diagram that illustrates a communication system in which a network appliance 1 comprises a novel hash lookup mechanism to speed up the routing of a packet flow. As illustrated in FIG. 1, packet 2 of a packet flow originated in a client 82, passed into network appliance 1, passed through network appliance 1, passed out of network appliance 1, and was forwarded on its way to a server 83 via a node in internet 84. The IP source address is in client 82 and the IP destination address is in server 83. The flow is one of two flows involved in a TCP connection, and the TCP connection is not terminated anywhere in network appliance 1. In the example illustrated in FIG. 1, packet 2 passes through the network appliance 1 wherein a novel hash lookup mechanism operates to speed up routing of the packet flow to its destination.

Figure 2:
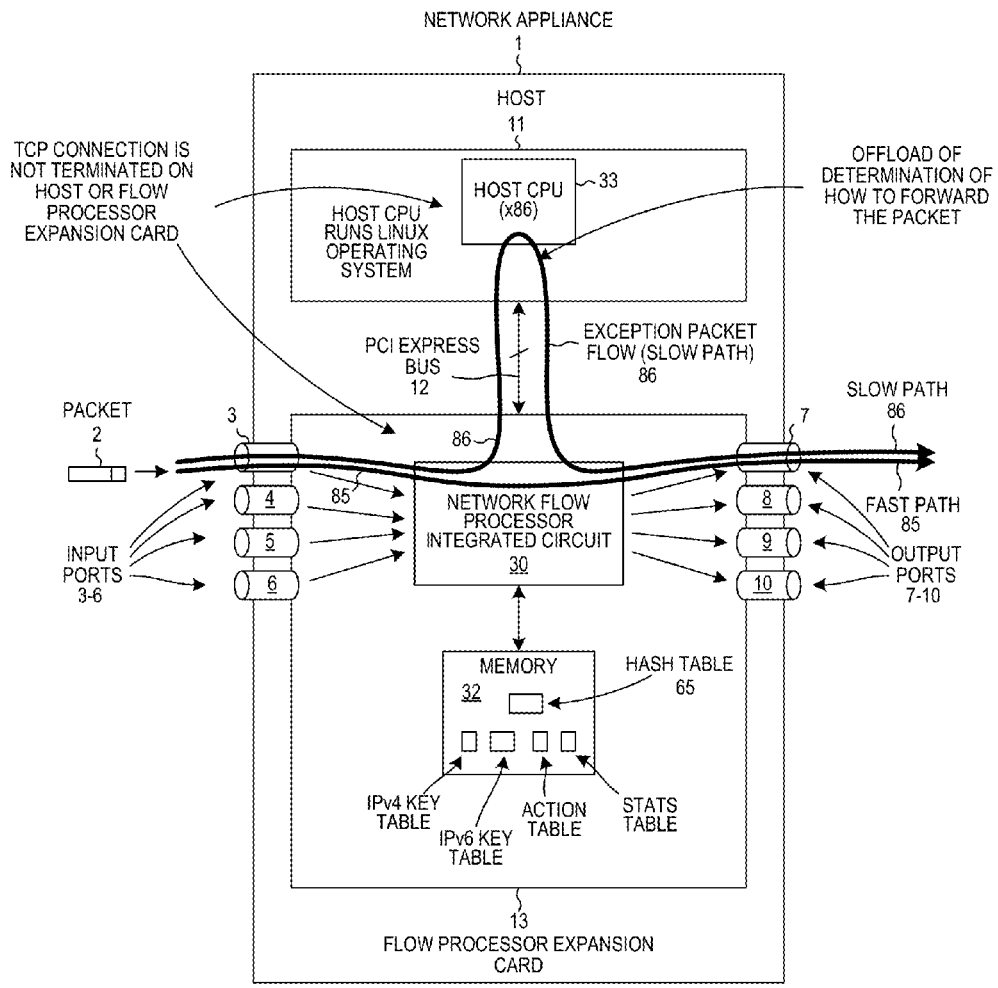
FIG. 2 shows an exemplary embodiment of the network appliance shown in FIG. 1.

FIG. 2 shows an exemplary embodiment of the network appliance 1 illustrated in FIG. 1. The network appliance 1 has multiple input ports 3-6 and multiple output ports 7-10. Network appliance 1 includes a host portion 11 that is connected via a high speed bus 12, such as a PCI express bus, to a flow processor expansion card portion 13. The host portion 11 is typically a motherboard assembly that includes a host CPU (central processing unit) 33, memory, and other circuitry (not shown). The host CPU 33 executes an instance of the LINUX operating system.

The flow processor expansion card portion 13 includes a network flow processor integrated circuit (NFPIC) 30 that routes packet flows received at the input ports (3-6) to the appropriate output ports (7-10). In a typical routing method, the NFPIC 30 receives incoming packets from the input ports (3-6) and offloads the determination of how to forward such packets to the host CPU 33. As illustrated by path 86, the incoming packets are routed to the host CPU 33 where the appropriate output port for the packet is determined. The packet and destination port are then returned to the NFPIC 30, which forwards the packet to the appropriate output port. This process results in the packet traversing the path 86, which results in relatively slow packet processing and routing.

In various exemplary embodiments, the network appliance 1 comprises a novel hash lookup mechanism that speeds up the routing of packet flows through the network appliance 1. The network flow processor expansion card include a memory 32 that stores hash table 65. The NFPIC 30 communicates with the memory to store and retrieve information to facilitate packet processing.

When processing packets using the novel hash lookup mechanism, the NFPIC 30 generates a hash value from a flow key associated with incoming packets. The hash values is used to search a selectable range of hash buckets stored in the hash table 65 to find a flow key match. When a match is found, the NFPIC 30 quickly determines a port number, which will be used to route the packet flow to the appropriate output port. For example, an incoming packet flow at port 3 is received by the NFPIC 30, which generates a hash value from the flow key associated with the flow. The hash value is used to search multiple hash buckets in the hash table 65 to determine the appropriate output port for the packet flow. For example, as illustrated by path 85, the incoming packets are processed by the NFPIC 30 using the novel hash lookup mechanism to determine the appropriate output port for the packet flow. This processing results in the packet traversing the path 85 directly to the output port 7, which results in fast packet processing and routing. Thus, the novel hash lookup mechanism speeds up the routing of packet flows through the network appliance 1.

Figure 3:
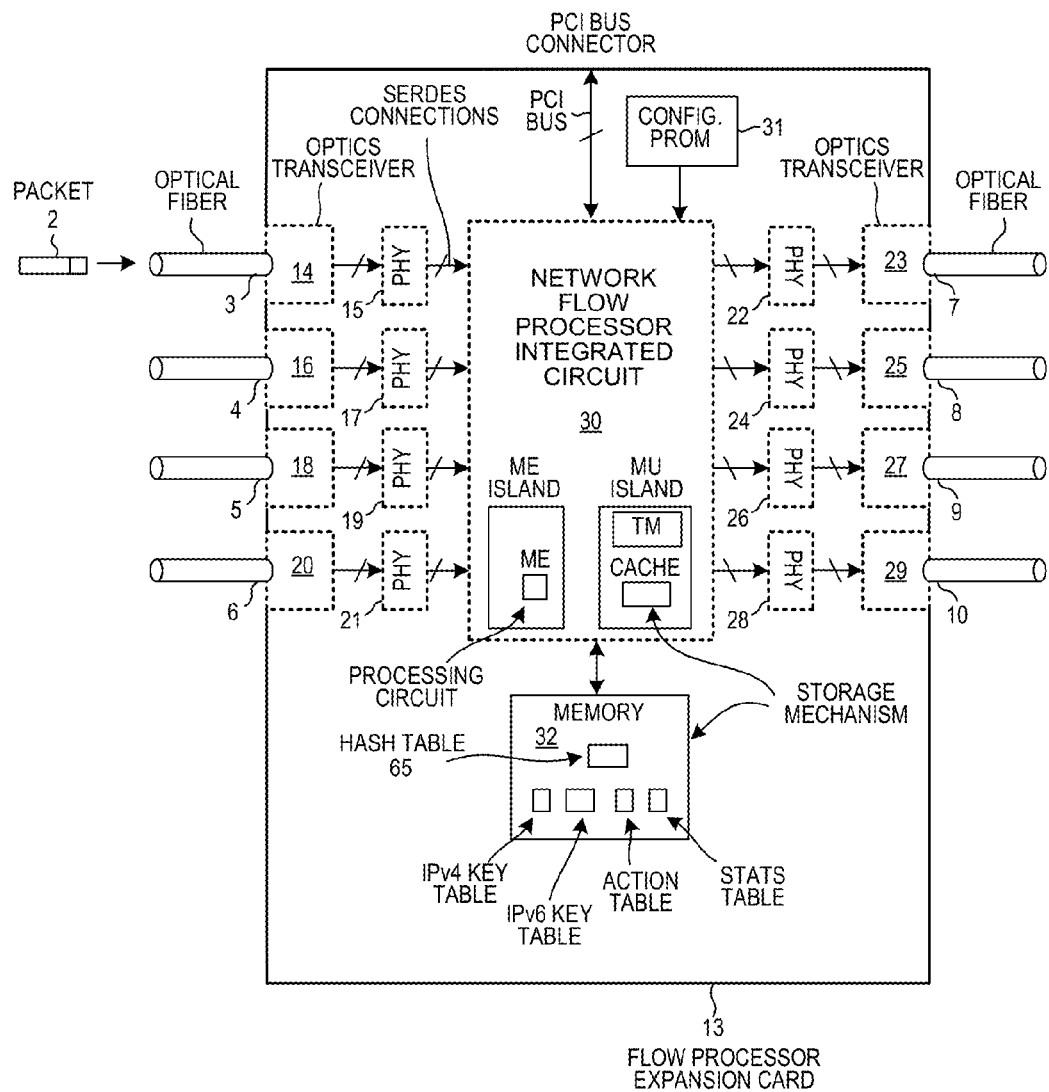
FIG. 3 shows a detailed exemplary embodiment of a flow processor expansion card within the network appliance shown in FIG. 1.

FIG. 3 shows a detailed exemplary embodiment of the flow processor expansion card portion 13 within the network appliance 1. As shown FIG. 3, flow processor expansion card portion 13 includes input port and output port circuitry 14, 16, 18, 20, 23, 25, 27, and 29, an island-based NFPIC 30, a configuration PROM 31, physical layer circuitry 15, 17, 19, 21, 22, 24, 26, and 28, and external memory 32. The NFPIC 30 also comprise a microengine (ME) island that includes at least one microengine, and a memory unit (MU) island that includes a cache memory. The ME, MU and memory 32 implement various exemplary embodiments of the novel hash lookup mechanism.

Figure 4:
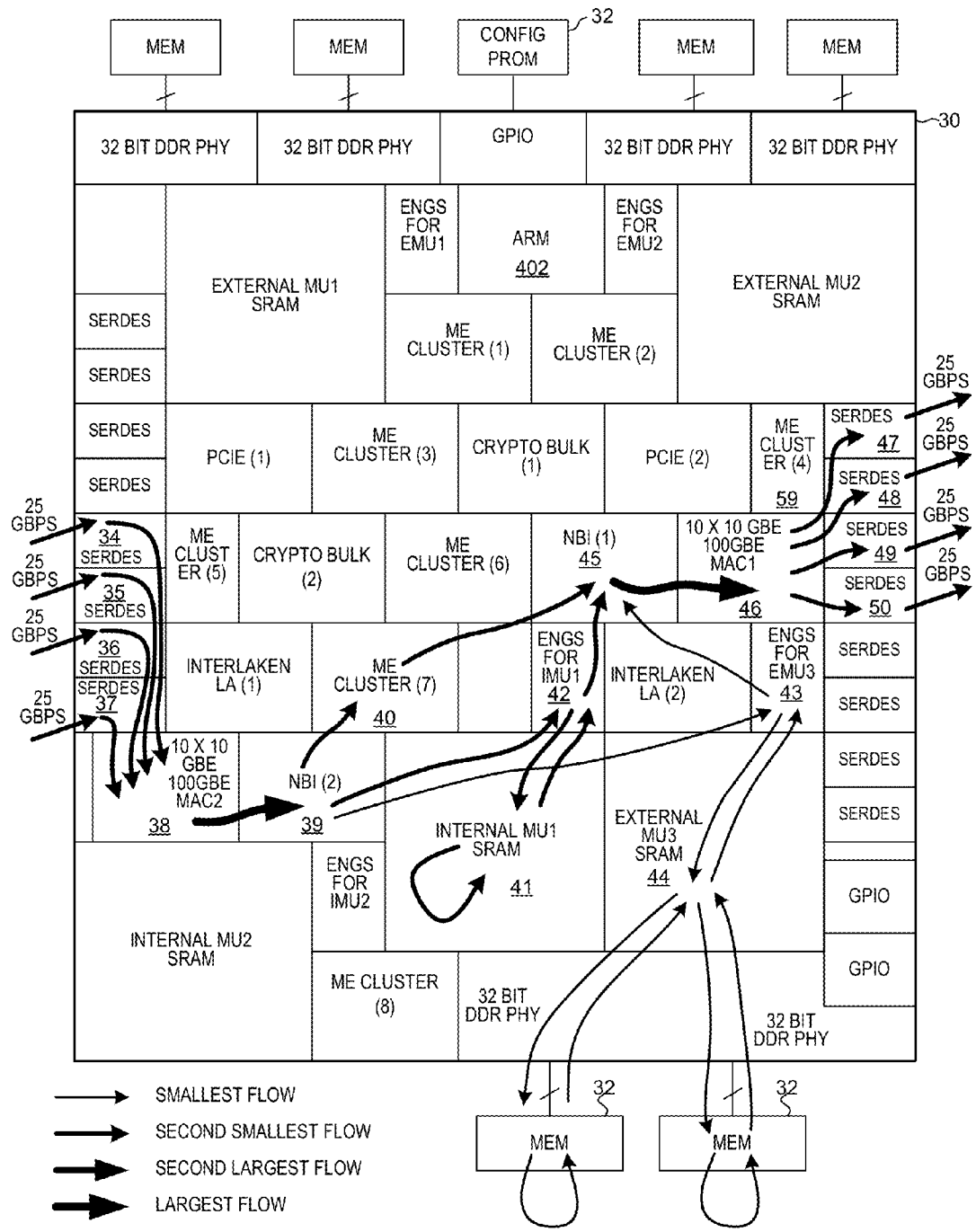
FIG. 4 shows an exemplary detailed embodiment of the network flow processor integrated circuit that resides on the flow processor expansion card shown in FIG. 3.

FIG. 4 shows an exemplary detailed embodiment of the network flow processor integrated circuit 30 that resides on the flow processor expansion card 13. Flows of packets pass through the various islands and blocks of the island-based integrated circuit 30 as indicated by the arrows of FIG. 4. Packet information from external PHY hardware pass into the integrated circuit 30 via SERDES blocks 34-37, and pass through a MAC island 38, and through an ingress NBI (NorthBound Interface) island 39. Headers of the packets generally pass to a microengine (ME) island 40, whereas the data payloads of the packets are generally stored into memory. Data payload information is put into internal SRAM memory block 41 via internal memory interface island 42. Data payload information is put into external DRAM memory 32 via external memory interface island 43 and block 44. After processing, the packet information passes through an egress NBI island 45, through an egress MAC island 46, and out of the integrated circuit 30 via SERDES blocks 47-50.

For additional information on the Network Flow Processor Integrated Circuit (NFPIC) 30 of FIG. 4, see: U.S. patent application Ser. No. 13/399,324, filed Feb. 17, 2012, titled "Configurable Mesh Data Bus In An Island-Based Network Flow Processor", by Gavin J. Stark (the entire subject matter of which is incorporated herein by reference).

In an exemplary embodiment, the ME cluster 40, IMU1 42, and memory 32 implement a novel hash lookup mechanism. For example, a microengine in the ME cluster 40 communicates a hash lookup command to a lookup engine in the IMU1 42 that causes a search of hash tables stored in the memory 30. A more detailed description of the novel hash lookup mechanism is provided below.

Figure 5:
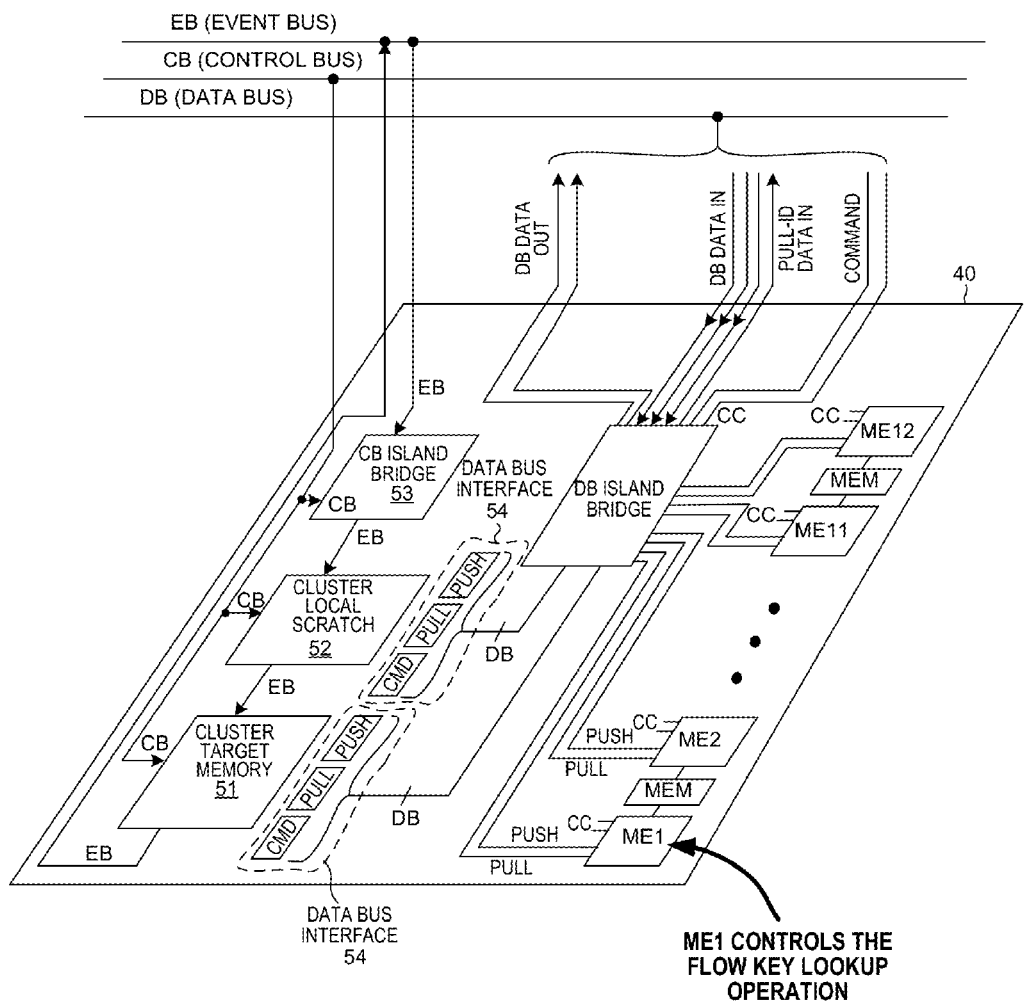
FIG. 5 shows a detailed diagram of an ME island of the network flow processor integrated circuit.

FIG. 5 shows a detailed diagram of ME island 40 of the NFPIC 30. Among other parts, ME island 40 includes several pairs of microengines ME1-ME12. Each pair of microengines shares an associated memory. In addition, ME island 40 includes a cluster target memory 51, a cluster local scratch 52, a control bus island bridge 53, and other bus interface circuitry 54.

In an exemplary embodiment, the ME1 controls a flow key lookup operation provided in exemplary embodiments of the novel hash lookup mechanism by generating a hash lookup command that is sent via the command mesh (COMMAND) of the DB bus to the lookup engine in the MU 42.

Figure 6:
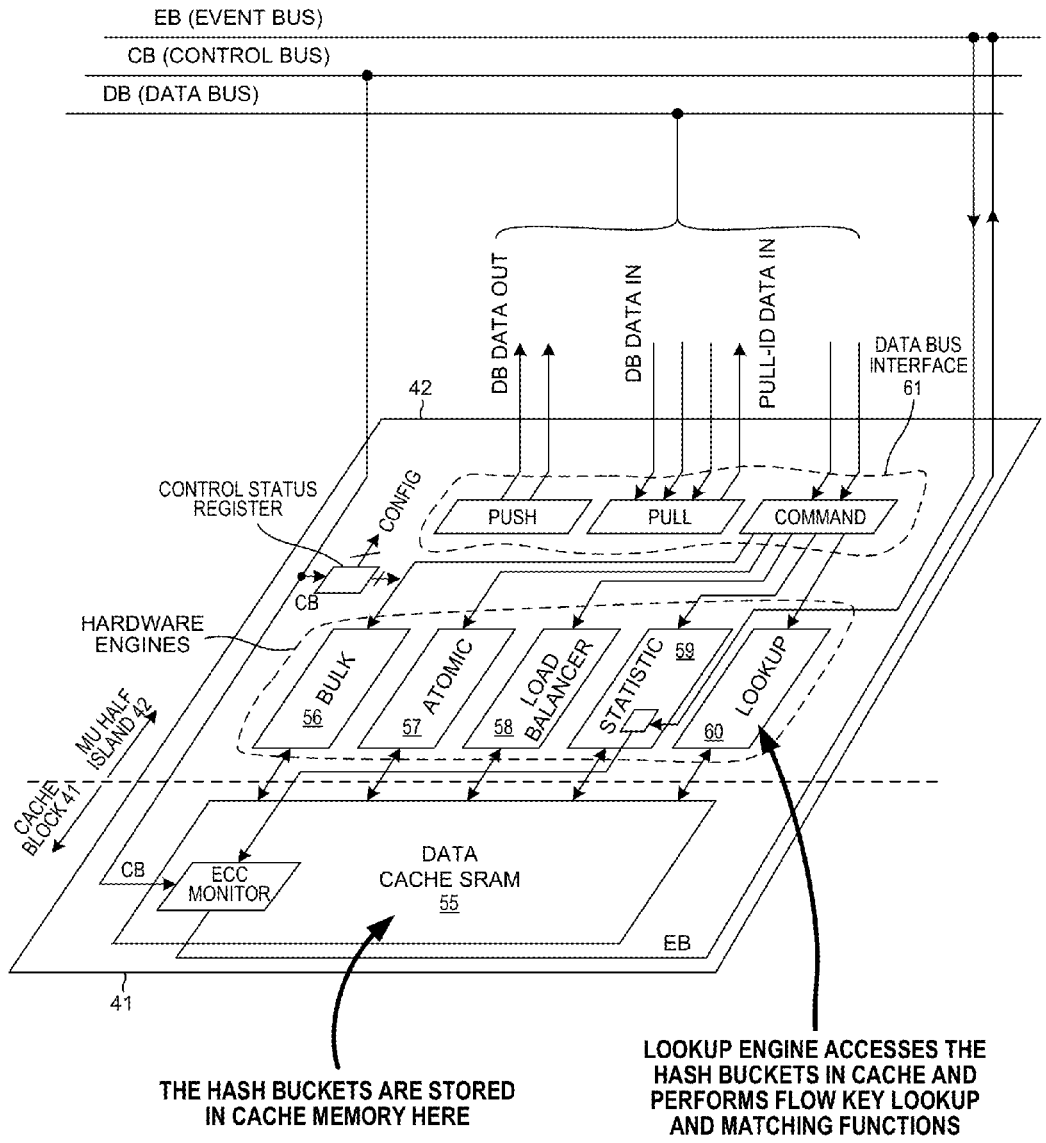
FIG. 6 shows a detailed diagram of a MU half island and cache block of the network flow processor integrated circuit.

FIG. 6 shows a detailed diagram of the MU half island 42 and cache block 41 of the NFPIC 30. Half island 42 and cache block 41 operate together as a transactional memory having several hardware engines and an amount of cache memory 55. The hardware engines include a bulk engine 56, an atomic engine 57, a load balancer engine 58, a statistics engine 59, and a lookup engine 60. The transactional memory can be accessed via bus interface circuitry 61.

In an exemplary embodiment, lookup engine 60 perform a novel hash lookup operation on the contents of cache memory 55. A microengine processor in ME island 40 obtains the result of the hash lookup operation across an interconnecting CPP (Command Push Pull) bus via bus interface 61. The external memory interface half island 43 and block 44 (see FIG. 4) are of similar architecture to the architecture set forth in FIG. 6, except that the associated memory of the transactional memory is not internal to integrated circuit 30 (such as in block 41) but rather is external to integrated circuit 30 in external DRAM 32.

Figure 7:
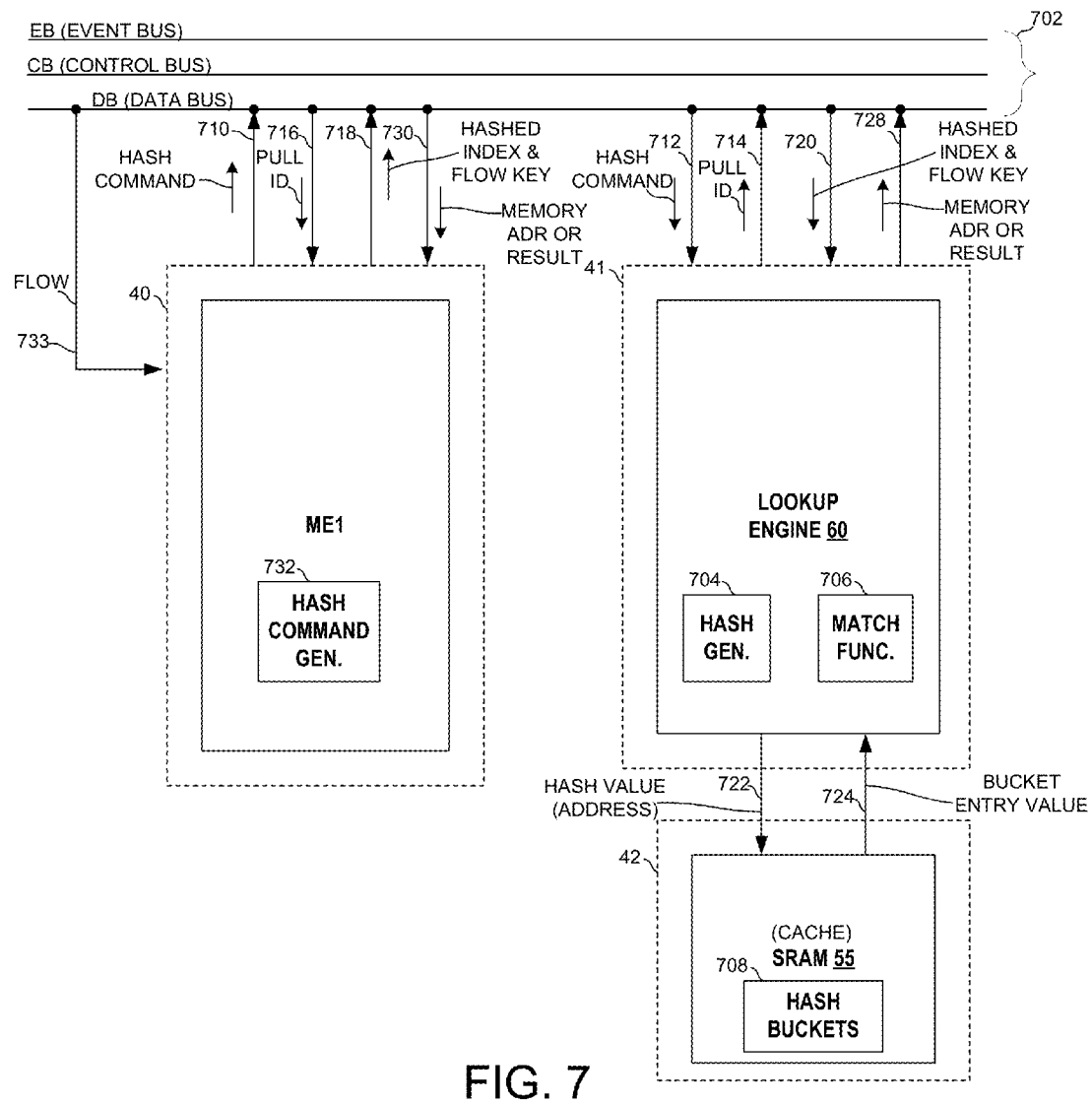
FIG. 7 shows a block diagram that illustrates the operation of the network flow processor integrated circuit to perform a novel hash lookup function.

FIG. 7 shows a block diagram that illustrates the operation of the NFPIC 30 to perform a novel hash lookup function. As shown in FIG. 7, ME island 40 includes ME1, MU half island 42 includes lookup engine 60, and cache block 41 includes cache SRAM 55. Also shown in FIG. 7 is CPP bus 702 that provides communication between the ME1 and the lookup engine 60.

The SRAM 55 includes a hash table 708 that comprises a plurality of hash buckets. In an exemplary embodiment, the hash table 708 is created by another entity at the NFPIC 30, such as the bulk generator 56. The ME1 performs a hash command generation function 732 to generate a hash command that is sent to the lookup engine 60 using the CPP 702. The lookup engine 60 performs a hash address generation function 704 to search selected buckets of the hash table 708 and a matching function 706 to detect matches between entries in the hash buckets and for example, flow key values associated with a packet flow.

During operation, ME1 receives an incoming packet flow 733 and begins the novel hash lookup process to determine an output port for the flow. The hash command generation function 732 generates a hash lookup command and outputs this command as shown at 710 onto the CPP bus 702. The hash lookup command is received by the lookup engine 60 of the MU 41, as shown by path 712. The hash lookup command provides the lookup engine with parameters that are used to search a selectable number of the hash buckets in the hash tables 708.

The lookup engine 60 generates a PULL_ID onto the CPP bus 702 as shown by the signal path 714. The PULL_ID is a request to the ME1 to receive a hashed index value and a flow key to be matched during the hash table lookup. The ME1 receives the PULL-ID data request and generates the hashed index value and the flow key data associated with the received data flow. For example, in an exemplary embodiment, the ME1 generates the hashed index value by applying a hashing function to the flow key data. The hashed index value and flow key are then output to the lookup engine in a PULL_DATA response as shown at signal path 718. The lookup engine 60 receives the PULL_DATA response as shown at path 720 and then begins a hash table lookup process.

During the hash table lookup process, the lookup engine 60 performs a hash address generation function 704 to generate addresses (e.g., hash values) that are used to search a selectable number of hash buckets in the hash tables 708. The hash values are communicated to the SRAM 55 over input path 722. The hash address generation function 704 determines a starting hash bucket and the selectable number of hash buckets to be searched from parameters in the received hash lookup command.

The matching function 706 operates to compare hash table values obtained from the hash buckets entries to the flow key value received from the ME1. In one aspect, when a confirmed match is detected, the address of the entry is returned to the ME1. In another aspect, a result value associated with the entry is returned to the ME1. For example, the result is transmitted onto the CPP bus 702 as shown by path 728 and received at the ME1 as shown by path 730. The ME1 uses the result of the hash lookup operation to quickly determine a routing path for the received packet flow. A more detailed description of the novel hash lookup function is provided below.

FIG. 8 shows a diagram of a hash lookup command generated by the hash command generation function 732. The hash command comprises a meta-data portion 802 and a command payload portion 804. The meta-data portion 802 includes a destination island indicator 806 and a valid indicator 808. The command payload 804 includes parameters and addressing information that is used by the lookup engine 60 to perform the novel hash lookup operation.

FIG. 9 shows a detailed diagram of the command payload 804 of the hash command. The command payload 804 includes a plurality of fields of selected width wherein some of the fields are specifically utilized to convey parameters and other information to the lookup engine 60 for the purpose of performing a novel hash lookup function. For example, in an exemplary embodiment, a 5-bit ACTION field is set to a value of "11010", a 2-bit TOKEN field is set to a value of "0" and a 40-bit address field comprises several parameters and address information for use by the lookup engine 60.

FIG. 10 shows a detailed diagram of the address field included in the command payload. The address field includes a 2-bit start position indicator 1002, a 6-bit hash command code 1004, a 3-bit table size 1006, a 17-bit base address 1008, a hash lookup indicator 1010, and one or more other indicator bits.

The 2-bit start position indicator 1002 indicates a starting bit position in the received hashed index value that identifies bits in the received hashed index value that are to be used to generate an address (e.g., hash value) to search selected hash buckets. The 6-bit hash command code 1004 identifies a type of search to be performed (e.g., LHASH or LHASHR), the size of the entries to be searched (e.g., 16, 28, 48, or 60 bits), the size of the hash buckets (e.g., 16 or 64 bytes), and the number of buckets (e.g., 2, 4 or 7) to be searched during the hash lookup operation. The 3-bit table size 1006 defines the hash lookup table size for the given operation in terms of the number of buckets. Hash tables range in size from 1K to 128K.

FIG. 11 shows a detailed table diagram that illustrates 6-bit hash command codes 1004 included in the address field of the command payload. Each hash command code is associated with a bucket size and bucket search length. For example, the hash command code hex (30) identifies a linear hash (LHASH) operation having a 16-byte bucket size with two (2) buckets being searched and the entries in the buckets having a 16 or 28 bit width. In an exemplary embodiment, the hash command codes are generated upon boot-up by a control processor, such as ARM island 402, shown in FIG. 4. In another example, the command codes are generated by a microengine located on an ME island. In still another example, the command codes are received via one of the input ports 3-6 (see FIG. 2) from another network entity.

Figure 12:
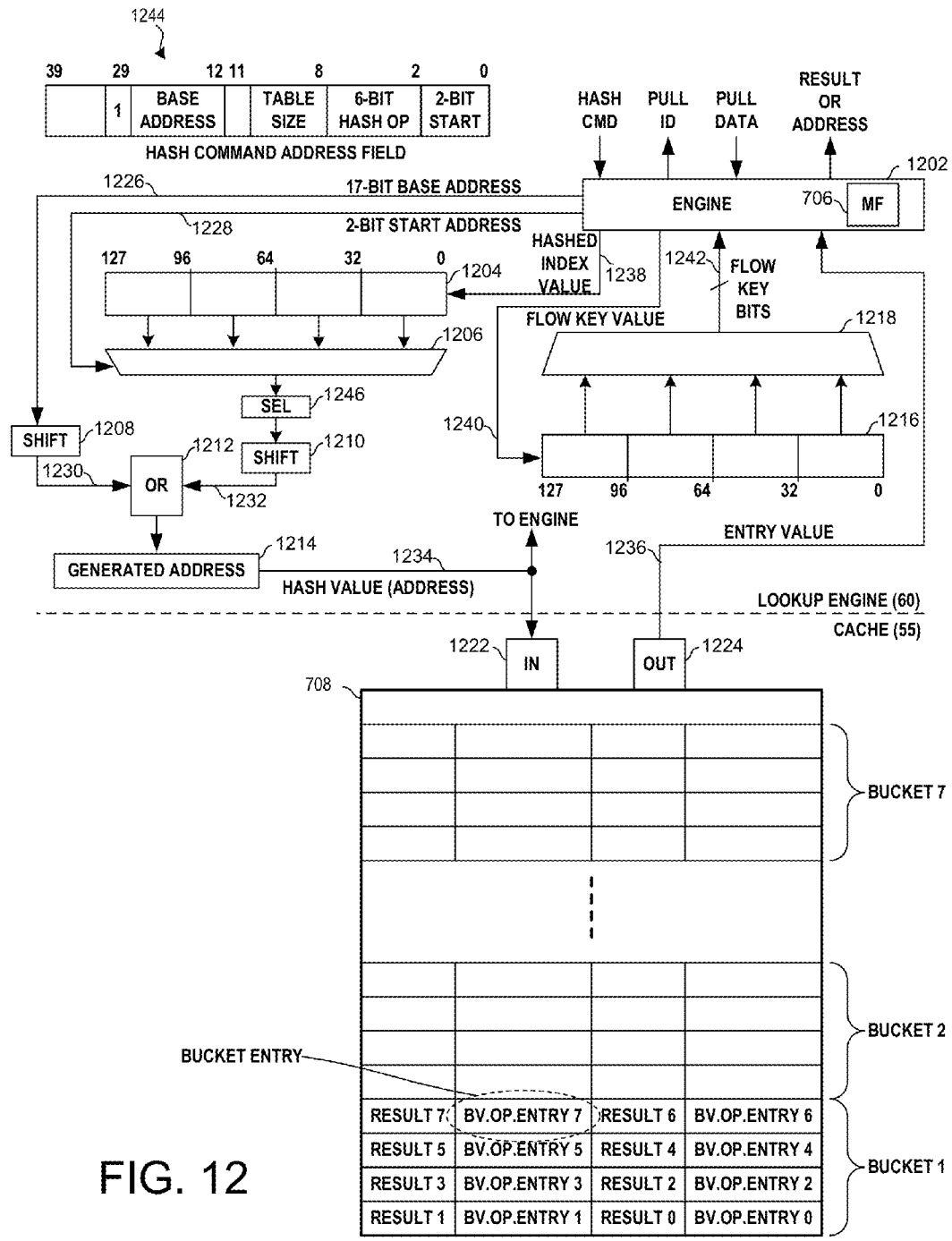
FIG. 12 shows a detailed functional diagram that illustrates the operation of a lookup engine and the SRAM to perform a novel hash lookup function.

FIG. 12 shows a detailed functional diagram that illustrates the operation of the lookup engine 60 and the SRAM 55 to perform a novel hash lookup function. The lookup engine 60 comprises an engine 1202, index register 1204, index multiplexer 1206, shift register 1208, shift register 1210, bit selector 1246, OR function 1212, and address register 1214. The lookup engine 60 also comprises flow key register 1216, flow key multiplexer 1218, and matching function 706 that is performed by the processor 1202. In an exemplary embodiment, the engine 1202 comprises RAM, ROM, registers, ports, combinational hardware and/or any other suitable hardware to perform the functions described herein. For additional information on the engine 1202 of FIG. 12, see: U.S. patent application Ser. No. 13/552,555, filed Feb. 17, 2012, titled "Recursive lookup with a Hardware Trie Structure that has no Sequential Logic Elements", by Gavin J. Stark (the entire subject matter of which is incorporated herein by reference).

The cache SRAM 55 comprises an input port 1222, an output port 1224, and hash table 708 that includes a plurality of hash buckets with each hash bucket having one or more entries. In this example, there are seven hash buckets and each hash bucket includes four lines of storage with multiple entries per line. However, various other hash table memory configurations are possible as illustrated in the drawings.

During operation, the processor 1202 receives the hash command from ME1 over the CPP bus. For example, the hash command includes the address field 1244 in the payload portion. In response to receiving the hash command, the processor 1202 generates a PULL_ID command onto the CPP bus to request additional information from ME1. In response, ME1 generates a hashed index and a flow key value that is received by the processor 1202 during a PULL_DATA operation. The flow key represents the data to be matched and the hashed index represents an index that is used to form an address used to access the hash table 708.

To generate the address (hash value 1234) to access the hash table 708, the 17-bit base address from the command payload is input to the shift register 1208. The shift register 1208 left-shifts the base address by 16 bits and inputs the result to the OR function 1212. The 2-bit start address from the command payload is input to the index multiplexer 1206. The hashed index value received in the PULL_DATA is input to the index register 1204 that inputs the hashed index value to the index multiplexer 1206. The 2-bit start address causes the index multiplexer 1206 to select one of four groups of hashed index bits for input to a bit selection register 1246. For example, the 2-bit start address selects one of four groups of bits (0-31, 32-63, 64-95 or 96-127) of the hashed index value to be input to the bit selector 1246. The bit selector 1246 then selects an amount of bits to be input to the shift register 1210. For example, the bit selector selects an amount of bits equal to [$\log_2$ (table size)] to be input to the shift register 1210. For example, if the table size field 1006 indicates a table size of 1K, then the selector 1246 selects 10 bits to be input to the shift register 1210. The shift register 1210 then left-shifts the selected hashed index bits by an amount equal to [$\log_2$ (bucket size)] bits. For example, if the bucket size is 16 bytes then the left-shift is 4 bits and if the bucket is 64 bytes then the left-shift is 6 bits.

The OR function 1212 combines the outputs 1230 and 1232 of the shift registers 1208 and 1210 to form an address that is stored in the register 1214. This address is output as a hash value on signal path 1234 and input to the input port 1222 of the SRAM 55 to access the hash table 708.

FIG. 13 shows a diagram that illustrates the operation of the OR function 1212 to generate an address (hash value) that is used to address the hash table 708 having a 64-byte bucket size. The generated address includes the 17-bit base address 1302 that is shifted by the shift register 1208 to occupy bit positions 32-16 of the generated address. Base on the operation of the bit selector 1246 and shift register 1210, starting at bit position 6 from 10-17 bits of the selected hashed index value are included. The variable number of bits (due to table size) may result in an overlap region 1308 where the base address overlaps with the selected hashed index bits. The OR function 1212 appropriately combines (ORs together) these overlapped bits. The remaining 6-bits (5-0) 1306 are filled with zero.

FIG. 14 shows a diagram that illustrates the operation of the OR function 1212 to generate an address (hash value) that is used to address the hash table 708 having a 16-byte bucket size. The generated address includes the 17-bit base address that is shifted by the shift register 1208 to occupy bit positions 32-16 of the generated address. Base on the operation of the bit selector 1246 and shift register 1210, starting at bit position 6 from 10-17 bits of the selected hashed index value are included. The variable number of bits (due to table size) may result in an overlap region where the base address overlaps with the selected hashed index bits.

The OR function 1212 appropriately combines (ORs together) these overlapped bits. The remaining 4-bits (3-0) are filled with zero.

Referring again to FIG. 12, the hash value on signal path 1234 is used to access buckets in the hash table 1220. In an exemplary embodiment, the bulk engine 56 or other entity creates and stores 16/64 byte-aligned hash tables in internal or external memory, which can be loaded into the SRAM cache 55. The search function is performed on the data by reading and comparing one cache line (128-bits) at a time.

As entries are read out of the hash buckets the data flows out of output port 1224 along path 1236 to the processor 1202. The flow key received by the processor 1202 is entered into the flow key register 1216 using signal path 1240. The flow key multiplexer 1218 selects bits of the flow key value and enters this data into the processor 1202 using signal path 1242. The processor 1202 performs the matching function 706 to determine if there is a match between the data read out from the hash buckets and the bits selected from the flow key value.

In an exemplary embodiment, the matching function 706 performs the following operations.

For i<=(number of buckets to be searched)
    For j<=(number of entries per bucket)
      if [selected flow key bits=bits of entry read at bucket(i) and entry(j)] and [BV=i]
        then if [LHASH operation]
        output address of entry(j)
        if [LHASHR operation]
        output result(j) associated with entry(j)
      end if
      j=j+1
i=i+1

As illustrated in the code above, bits at entry(j) in bucket (i) are compared to the selected bits of the flow key. If the bits match and it is an LHASH operation, then the address of entry(j) is returned to the ME1. If the bits match and it is an LHASHR operation, then the result(j) associated with the entry(j) is returned to the ME1. The lookup operation continues looking until the maximum number of buckets are searched based on the hash command opcode. If there is no match, an exception condition is returned to the ME1. Also, while looking into multiple buckets, if the end of table is reached, then the lookup engine starts looking from the base address. If no match is found after searching the maximum number of buckets from the starting bucket, an exception condition is returned which is all 0's. Accordingly, the novel hash command identifies a type of operation (LHASH or LHASHR), a bucket size, a range of buckets to search, a number of entries to search, and a data size. Thus, a "hash range" is determined by the number of buckets and the number of entries to be searched.

The LHASHR lookup operations are similar to LHASH, however the tables for these types of lookups contain results. These operations will return the result that is stored adjacent to the data when a match is found. At the completion of the operation of the matching function, the processor 1202 obtains the result and outputs the result to the ME1 on the CPP bus.

Linear Hash Tables

In an exemplary embodiment, the linear hash tables are divided up into 16-byte or 64-byte buckets. Each table entry contains a set of bucket valid (BV) bits indicating whether or not the table entry is valid for the particular bucket number in which the entry is located. The hash table entry is allowed to be valid in at most one bucket. The entry may not be valid in any of the buckets, which is indicated by BV bits of all zeros.

Buckets are numbered in sequential order from least to greatest, and are organized in order in memory. In an exemplary embodiment, the three BV bits indicate the following states.

0x0=The entry is not valid for any bucket
0x1=The entry is valid for the first bucket
0x2=The entry is valid for the second bucket
0x3=The entry is valid for the third bucket
0x4=The entry is valid for the fourth bucket
0x5=The entry is valid for the fifth bucket
0x6=The entry is valid for the sixth bucket
0x7=The entry is valid for the seventh bucket Bucket Contents The linear hash table is populated with the following items.

1. BV: The MSBs of the LHASH table entry are used to indicate the bucket number that the entry is valid for.
2. Op: Indicates whether the entry to be matched is 16, 28, 48, or 60 bits depending on the type of operation. A "0" means match 16 or 48 bits and a "1" means match 28 or 60 bits.
3. Entry value: Comprises bits to be matched to the selected bits of the flow key.

FIG. 15 shows a 16-byte LHASH16/LHASH28 hash table memory configuration. For example, as shown in FIG. 15, one data line in the hash table comprises 128-bits that include a first entry 1502, a second entry 1504, a third entry 1506 and a fourth entry 1508. Each of the entries is 32-bits long and includes BV bits, OP bits, and a corresponding entry. For the 16-byte LHASH16 configuration the OP bits are set to 0 and for the 16-byte LHASH28 operation the OP bits are set to 1.

FIG. 16 shows a 64-byte LHASH16/LHASH28 hash table memory configuration. For example, as shown in FIG. 16, four data lines in the hash table comprises four lines of 128-bits each, that each includes four entries. Each of the entries is 32-bits long and includes BV bits, OP bits, and a corresponding entry. For the 64-byte LHASH16 configuration the OP bits are set to 0 and for the 64-byte LHASH28 operation the OP bits are set to 1.

FIG. 17 shows a 16-byte LHASH48/LHASH60 hash table memory configuration. For example, as shown in FIG. 17, one data lines in the configuration comprises one line of 128-bits that includes two entries. Each of the entries is 64-bits long and includes BV bits, OP bits, and a corresponding entry. For the 16-byte LHASH48 configuration the OP bits are set to 0 and for the 16-byte LHASH60 operation the OP bits are set to 1.

FIG. 18 shows a 64-byte LHASH48/LHASH60 hash table memory configuration. For example, as shown in FIG. 18, four data lines in the configuration comprises four lines of 128-bits each, that each includes two entries. Each of the entries is 64-bits long and includes BV bits, OP bits, and a corresponding entry. For the 64-byte LHASH48 configuration the OP bits are set to 0 and for the 64-byte LHASH60 operation the OP bits are set to 1.

FIG. 19 shows a 16-byte LHASHR16/LHASHR28 hash table memory configuration. For example, as shown in FIG. 19, one data lines in the configuration comprises 128-bits that include four entries. Each of the entries is 32-bits long. Two of the entries include BV bits, OP bits, and a corresponding entry. The other two entries are result values, each associated with a corresponding entry. For the 16-byte LHASHR16 configuration the OP bits are set to 0 and for the 16-byte LHASHR28 operation the OP bits are set to 1.

FIG. 20 shows a 64-byte LHASHR16/LHASHR28 hash table memory configuration. For example, as shown in FIG. 20, four data lines in the configuration comprises four lines of 128-bits each, that each includes four entries. Each of the entries is 32-bits long. Two of the entries include BV bits, OP bits, and a corresponding entry. The other two entries are result values, each associated with a corresponding entry. For the 64-byte LHASHR16 configuration the OP bits are set to 0 and for the 64-byte LHASHR28 operation the OP bits are set to 1.

FIG. 21 shows a 16-byte LHASHR48/LHASHR60 hash table memory configuration. For example, as shown in FIG. 21, one data lines in the configuration comprises 128-bits that includes two entries comprising an entry and corresponding result. The entry is 64-bits long and includes BV bits, OP bits, and a corresponding entry. The corresponding result is 32-bits long. For the 16-byte LHASHR48 configuration the OP bits are set to 0 and for the 16-byte LHASHR60 operation the OP bits are set to 1.

FIG. 22 shows a 64-byte LHASHR48/LHASHR60 memory configuration. For example, as shown in FIG. 18, four data lines in the configuration comprises four lines of 128-bits each that include two entries comprising an entry and corresponding result. The entry is 64-bits long and includes BV bits, OP bits, and a corresponding entry. The corresponding result is 32-bits long. For the 64-byte LHASHR48 configuration the OP bits are set to 0 and for the 64-byte LHASHR60 operation the OP bits are set to 1.

Iterative Operation

FIG. 23 shows an exemplary embodiment of a hash command that indicates an iterative lookup operation. In an exemplary embodiment, the 31-bit hash result from an LHASHR operation may be recursive and require an additional lookup to be performed. If that is the case, the lookup engine will continue to process the subsequent instruction up to the recursion limit set during configuration.

Method of Operation

Figure 24:
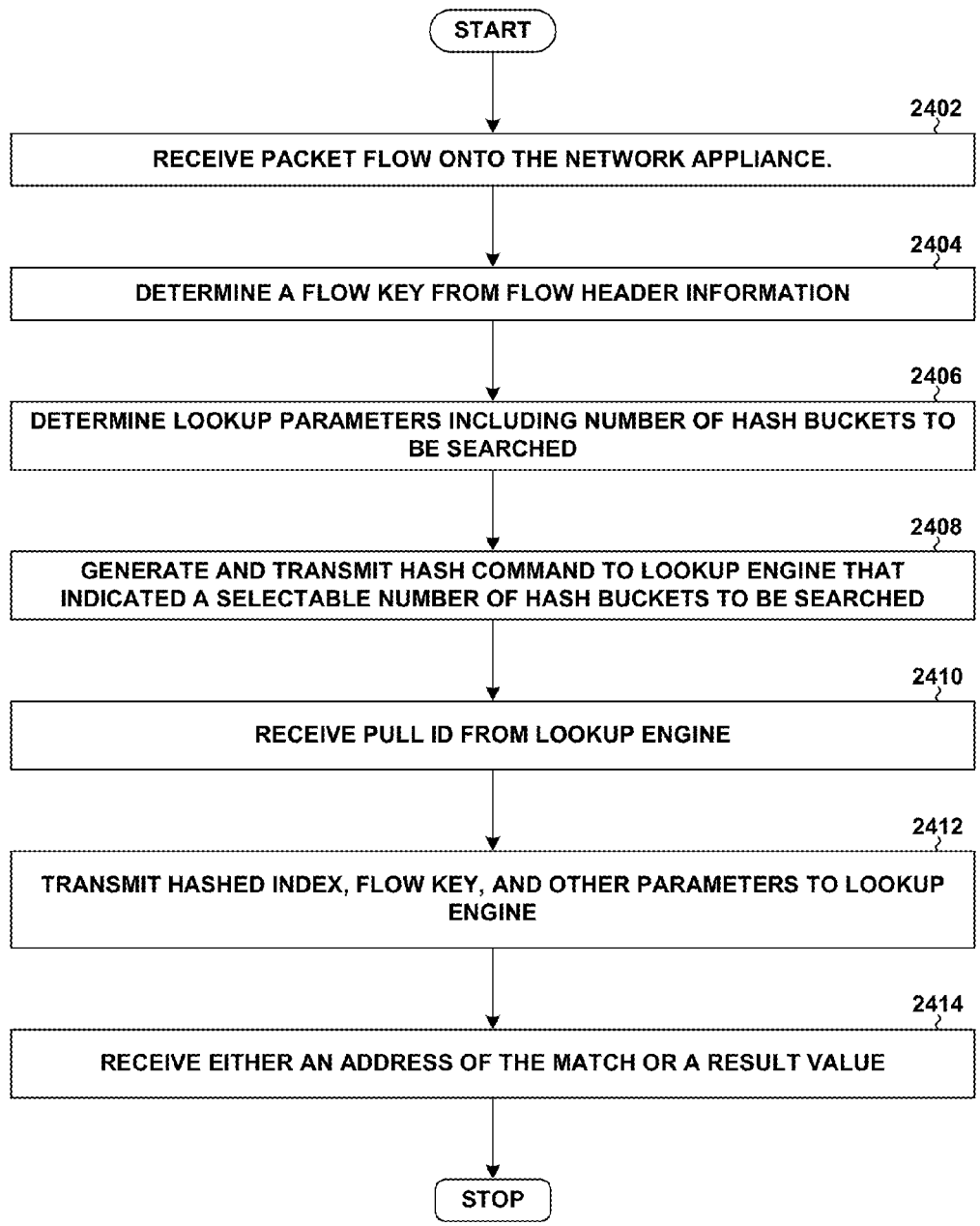
FIG. 24 shows a method of operating a microengine in a network appliance to perform a novel hash lookup function to increase the speed of packet routing in a network appliance.

FIG. 24 shows a method of operating a microengine in a network appliance to perform a novel hash lookup function to increase the speed of packet routing through the network appliance.

At block 2402, a packet flow is received at a microengine in a network appliance. For example, a packet flow is received by ME1 shown in FIG. 7.

At block 2404, a flow key is determined from the packet flow. In an exemplary embodiment, the ME1 decodes the packet header information to form a flow key associated with the packet flow. In an exemplary embodiment, the flow key is formed from the 5-tuple associated with the packet flow.

At block 2406, parameters associated with a hash lookup command are generated. For example, ME1 generates the address field of the hash lookup command to include the various parameter field shown in FIG. 10. For example, the ME1 generates the 2-bit start address 1002, 6-bit hash command code 1004, 3-bit table size 1006, 17-bit base address 1008, hash lookup indicator 1010, and any other parameter needed for the hash lookup command.

At block 2408, the hash lookup command is generated and transmitted to a lookup engine. For example, the ME1 generates the hash lookup command as shown in FIG. 8, which includes the payload as described above and transmits the command to the lookup engine 60 using the CPP bus 702, as shown at signal path 710. The novel hash lookup command include parameters and codes to instruct the lookup engine to perform hash table lookup operation for a selectable number buckets with each bucket having a pre-configured number of entries.

At block 2410, a pull id is received from the lookup engine. In response to receiving the hash lookup command, the lookup engine 60 generates a pull id onto the CPP bus 702 that is received by the ME1, as shown by path 716.

At block 2412, a hash index value, a flow key, and other parameters are transmitted to the lookup engine in response to the pull id. In an exemplary embodiment, the ME1 generates the hash index value and the flow key value as described above and transmits this information over the CPP bus 702 to the lookup engine 60, as shown by path 718

At block 2414, an address of a matching value or a result value is received at the ME1 after the hash lookup is performed. In an exemplary embodiment, the lookup engine 60 performs the required lookup and returns the results of the lookup to the ME1, which is received at the ME1 as shown by path 730. The packet flow is routed in accordance with the received lookup result. For example, the ME1 utilized the lookup result to route the received patch flow.

Thus, a method of operating a microengine to perform a novel hash lookup is provided to increase the speed of packet routing in a network appliance.

Figure 25:
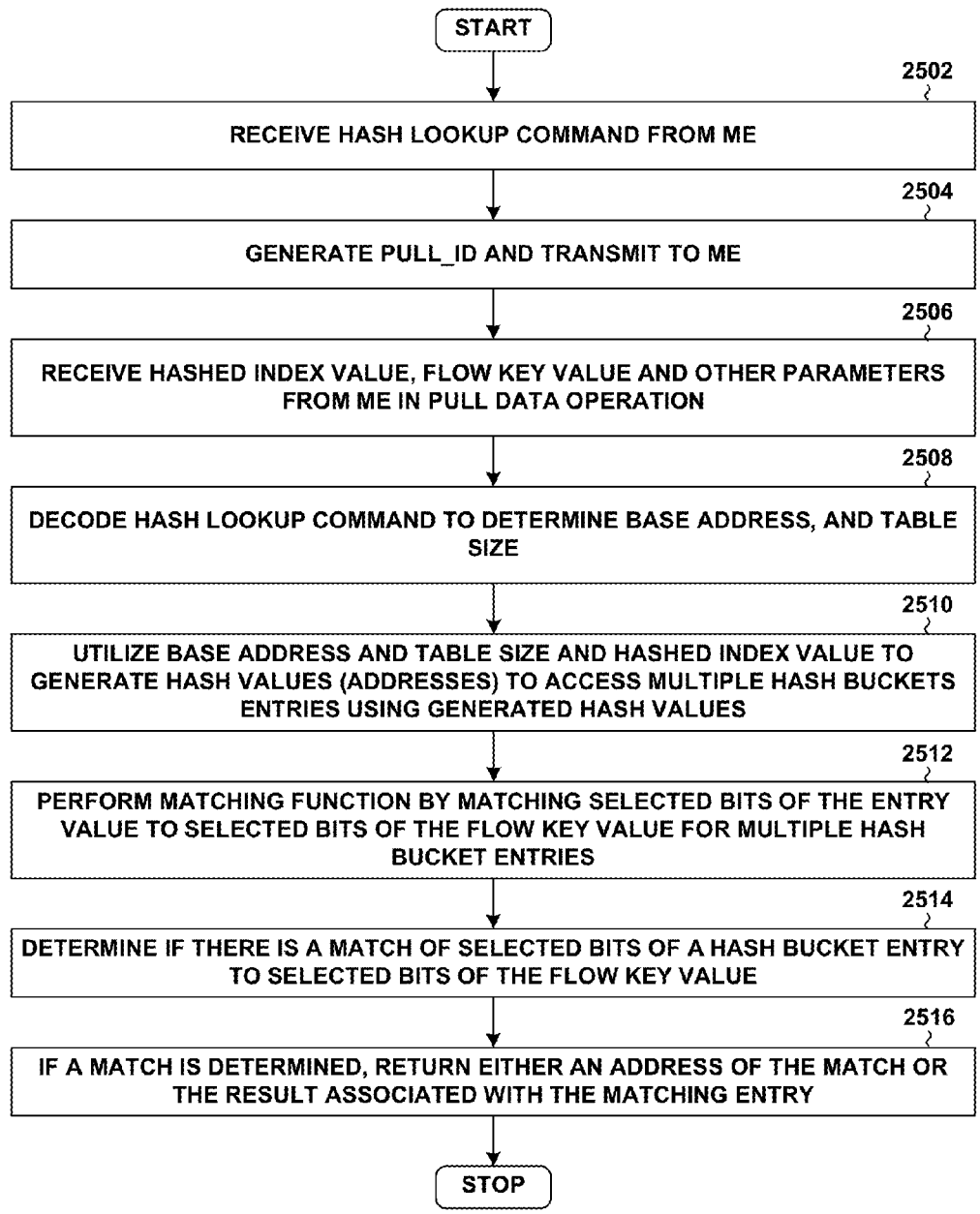
FIG. 25 shows a method of operating a lookup engine in a network appliance to perform a novel hash lookup function to increase the speed of packet routing in a network appliance.

FIG. 25 shows a method of operating a lookup engine in a network appliance to perform a novel hash lookup function to increase the speed of packet routing in a network appliance.

At block 2502, a hash lookup command from an ME is received at a lookup engine. For example, the lookup engine 60 receives the hash lookup command from the ME1, as shown at path 712.

At block 2504, a pull id request is generated and transmitted to a microengine over a CPP bus. For example, the lookup engine 60 generates the pull id and transmits it to the ME1, as shown at path 714.

At block 2506, a hashed index value, a flow key, and other parameters are received in a pull data operation. For example, the lookup engine 60 receives the hashed index value, flow key and other parameters as shown at path 720.

At block 2508, the hash lookup command is used to determine a base address, table size, opcode, start bits, and other parameters of a hash lookup function. For example, the processor 1202 decodes the hash command to determine the above parameter from fields in the hash command payload.

At block 2510, hash values(addresses) are generated to access a bucket entries in a hash table. In an exemplary embodiment, the index register 1204, index multiplexer 1206, bit selector 1246, shift register 1208, shift register 1210, and OR function 1212 and address register 1214 operate to generate an address as described above, which is used to access the hash table 708. For example, the base address, table size, opcode, start bits, and other parameters included in the hash lookup command are used as described above to generate the address. The above identified components shown in FIG. 12 form the hash address generator 704 shown in FIG. 7. As a result, an address (or hash value) is output from the register 1214 that is used to access the hash table 708.

At block 2512, a matching function is performed for multiple hash buckets entries. In an exemplary embodiment, the matching function 706 operates to access the buckets of the hash table to compare selected bits of the values in the bucket entries with selected bits of the flow key value. For example, the matching function performs the functional code shown above to look through a selectable number of hash buckets to determine if a match is found.

At block 2514, a determination is made as to whether hash table entries and the flow key match. In an exemplary embodiment the matching function 706 determines if a match is found by matching selected bits of the selected bucket and entry from the hash table with selected bits of the received flow key. The matching functions proceeds through the entire range of buckets and entries indicated in the hash command unless a match is found. If no match is found after searching all indicated buckets and entries an exception condition is returned.

At block 2516, if a match is determined, either an address of the match or a result value associated with the matching bucket entry is returned to the microengine over the CPP bus. For example, the matching function 706 detects a matching bucket entry and if an LHASH operation is performed, returns the address of the match. If a matching bucket entry is found and an LHASHR operation is performed, a result value associated with the match is returned. If no match is found, then an exception condition is returned.

Thus, a method is provided for operating a lookup engine to perform a novel hash lookup to increase the speed of packet routing in a network appliance. It should be noted that the operations of the method may be rearranged or otherwise modified within the scope of the exemplary embodiments.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) providing access to a hash table, wherein the hash table comprises a plurality of hash buckets, wherein each hash bucket comprises a plurality of entry fields;
   (b) receiving a hash lookup command;
   (c) using the hash lookup command to receive hash command parameters, a hashed index value, and a flow key value;
   (d) generating a hash value (address) using the hash command parameters and the hashed index value to access a selected entry field in a selected hash bucket, wherein the selected entry field contains an entry value, and wherein generating of the hash value comprises using a base address and the hashed index value to generate the hash value, and wherein the base address is communicated as part of the hash lookup command;
   (e) matching selected bits of the entry value to selected bits of the flow key value;
   (f) repeating the operations of (d) and (e) until the selected bits of the entry value match the selected bits of the flow key value or until a selectable number of hash buckets have been accessed; and
   (g) returning one of an address of the selected entry field or a result associated with the selected entry field if the selected bits of the entry value match the selected bits of the flow key value.

2. The method of claim 1, wherein generating the hash value in (d) comprises:
   shifting the base address to generate a shifted base address;
   identifying selected bits of the hashed index value;
   shifting the selected bits of the hashed index value to generate shifted hashed index bits; and
   combining the shifted base address with the shifted hashed index bits to generate the hash value.

3. The method of claim 2, wherein shifting the base address comprises left-shifting the base address by 16 bits to generate a shifted base address.

4. The method of claim 2, further comprising decoding a 2-bit starting field indicator in the hash command to identify the selected bits of the hashed index value.

5. The method of claim 2, further comprising decoding a 6-bit hash code in the hash command to determine a number of bits to left-shift the selected bits of the hashed index value to generate shifted hashed index bits.

6. The method of claim 2, further comprising using an OR function to combine the shifted base address with the shifted hashed index bits using to generate the hash value.

7. The method of claim 1, wherein a portion of the entry fields include the entry value, a bucket value (BV) indicator, and an operation (OP) indicator.

8. The method of claim 7, wherein the operation (OP) indicator is a zero for a first operation.

9. The method of claim 7, wherein the operation (OP) indicator is a one for a second operation.

10. The method of claim 1, wherein a portion of the entry fields include associated result values.

11. The method of claim 1, wherein (a) through (g) are performed by a lookup engine.

12. The method of claim 1, wherein (a) through (g) are performed by a lookup engine, and wherein the hash command is sent by a processor across a CPP (Command/Push/Pull) bus to the lookup engine.

13. The method of claim 1, wherein (a) through (g) are performed by a lookup engine, and wherein the hash command is sent by a processor across a CPP (Command/Push/Pull) bus to the lookup engine, wherein the lookup engine in response to receiving the hash command issues a pull-id onto the CPP bus and receives pull data in response, wherein the pull data includes the hashed index value and the flow key value.

14. A method comprising:
   (a) receiving a packet flow;
   (b) generating a flow key value from header information associated with the packet flow;
   (c) generating a hash command that includes hash command parameters that indicate a number of selectable number of hash buckets to be searched and a base address;
   (d) transmitting the hash command to a lookup engine;
   (e) receiving a pull id from the lookup engine;
   (f) transmitting a hashed index value and the flow key value to the lookup engine, wherein the hashed index value and the base address are used to generate a hash value;
   (g) receiving either an address of a match or a result value from the lookup engine; and
   (h) routing the packet flow based on either the address of the match or the result value.

15. The method of claim 14, further comprising determining a 6-bit hash command code to determine a hash table size and a number of hash buckets to be searched.

16. The method of claim 15, further comprising generating the hash command to include a 2-bit starting field indicator, the 6-bit hash command code, a 3-bit table size, and a 17-bit base address.

17. The method of claim 15, obtaining the 6-bit hash command code from a first island located in an Island-Based Network Flow Processor.

18. An apparatus comprising:
- a lookup engine that performs a hash table lookup operation in response to a hash lookup command;
- means for generating hash values (addresses) used to access a selectable number of buckets in a hash table that includes a plurality of buckets, wherein each hash bucket comprises a plurality of hash entry fields, wherein the means for generating hash values comprises using a base address and a hashed index value to generate the hash value, and wherein the base address is communicated as part of the hash lookup command; and
- means for matching entries in the hash entry fields of the selectable number of hash buckets to a flow key value, wherein when a match is determined at a selected entry field one of an address of the selected entry field or a result associated with the selected entry field is returned.

19. The apparatus of claim 18, wherein the means for hash address generation comprises:
- means for shifting a base address to generate a shifted base address;
- means for identifying selected bits of the hashed index value;
- means for shifting the selected bits of the hashed index value to generate shifted hashed index bits; and
- means for combining the shifted base address with the shifted hashed index bits to generate the address (hash value).

* * * * *